United States Patent [19]

Stöver et al.

[11] Patent Number: 5,198,123
[45] Date of Patent: Mar. 30, 1993

[54] PLATE FILTER PRESS

[75] Inventors: Hans-Martin Stöver, Buchholz; Günther Suhr, Seevetal; Thomas Willner, Hamburg, all of Fed. Rep. of Germany

[73] Assignee: Krupp Maschinentechnik GmbH, Essen, Fed. Rep. of Germany

[21] Appl. No.: 589,633

[22] Filed: Sep. 28, 1990

[30] Foreign Application Priority Data

Sep. 28, 1989 [DE] Fed. Rep. of Germany .... 39 32 422

[51] Int. Cl.$^5$ .................... B01D 25/168; B01D 25/32
[52] U.S. Cl. .................. 210/791; 210/185; 210/225; 210/228; 210/229; 210/231; 210/499; 100/197; 100/198; 100/211
[58] Field of Search ............... 210/185, 225, 227–229, 210/231, 499, 769, 770, 791; 100/38, 113, 115, 196–198, 211

[56] References Cited

U.S. PATENT DOCUMENTS

| | | | |
|---|---|---|---|
| 1,147,279 | 7/1915 | Sweetland | 55/525 |
| 1,349,238 | 8/1920 | Sweetland | 210/231 |
| 2,989,187 | 6/1961 | Demeter | 210/227 |
| 3,390,772 | 7/1968 | Juhasz | 210/225 |
| 4,617,863 | 10/1986 | Kenyon | 210/227 |
| 4,773,996 | 9/1988 | Endo et al. | 210/225 |

FOREIGN PATENT DOCUMENTS

| | | |
|---|---|---|
| 0149821 | 7/1985 | European Pat. Off. . |
| 583317 | 9/1933 | Fed. Rep. of Germany . |
| 1902022 | 10/1964 | Fed. Rep. of Germany . |
| 1536909 | 1/1970 | Fed. Rep. of Germany . |
| 3105232 | 11/1981 | Fed. Rep. of Germany . |
| 3410706 | 10/1985 | Fed. Rep. of Germany . |
| 3713419 | 11/1988 | Fed. Rep. of Germany . |
| 5234466 | 3/1977 | Japan . |
| 0907485 | 10/1962 | United Kingdom . |

*Primary Examiner*—Robert A. Dawson
*Assistant Examiner*—Matthew O. Savage
*Attorney, Agent, or Firm*—Spencer, Frank & Schneider

[57] ABSTRACT

A plate filter press for the mechanical separation of solids from a liquid forming a suspension. The plate filter press is made of a plurality of vertical membrane plates and filter plates, the membrane plates and filter plates alternating. The space between the membrane plates and filter plates defines a filter chamber, which can be opened by moving the plates apart. An impermeable and flexible membrane is positioned in the filter chamber and is sealed to the periphery of the membrane plate. The space between the membrane and the membrane plate defines a pressure medium chamber for receiving pressure medium. The space between the membrane and the filter plate defines a suspension chamber for receiving the suspension. Finally, a woven metal fabric filter is positioned on each side of the filter plate. Both the filter plates and the woven metal fabric filters are planar. Liquid from the suspension is discharged through the woven metal fabric filter toward the interior of the filter plates. The membranes are round and smooth and preshaped so that in accordance with the configuration of the membrane plates particularly in the clamping region stress peaks on the membranes are avoided. In addition to filtering the membranes are used for heat transfer, to effect temperature adjustment of the suspension and also to effect thermal cleaning of the filter after each emptying of the press. For this, pressure circulation of the temperature-adjusted pressure medium is used.

7 Claims, 4 Drawing Sheets

PLATE FILTER PRESS

CROSS REFERENCE TO RELATED APPLICATION

This application claims the priority of Application Number P 39 32 422.2, filed on Sep. 28, 1989, in Federal Republic of Germany, the subject matter of which is incorporated herein by reference.

BACKGROUND OF THE INVENTION

1. Field of the Invention

The present invention relates to a plate filter press for the mechanical separation of solids from liquids, such as oil or water, in suspensions.

2. Discussion of the Background

Filter presses are employed in many situations, such as the separation of crystallized fat suspensions, for mechanically removing the oil from paraffin and naphthalene suspensions, for mechanically drying slurries, for mechanically separating solvents from chemical or pharmaceutical suspensions and other separating processes. However, a combination of mechanical and thermal separation for complete phase separation in an apparatus which can also use temperature to clean the filter medium when the apparatus is not in use is not known. Moreover, there is no easy way to adjust the temperature of the suspension within the press during operation, i.e., to selectively heat and/or cool it. Moreover, in many cases the pressures realizable are insufficient to ensure adequate preliminary mechanical separation.

Plate filter presses employed for this purpose, which operate according to the frame or chamber filter principle, are composed of several filter plates arranged next to each other forming filter chambers in which a suspension is filtered. Increased pressure is typically generated by compressed air which is separated from the suspension by an impermeable, flexible membrane, e.g. a rubber membrane. The use of compressed air has the drawbacks that: (1) in large presses and at high pressures, considerable volumetric pressures are attained which potentially are very dangerous and, (2) compressed air is unsuitable as a heat transfer medium for temperature adjustment purposes.

A further drawback of the prior art plate filter presses is that generally they must not be operated in an empty state. This would raise the danger of destruction of the membrane.

In many cases, the membranes serve as seals for the chambers against the environment. The membranes must then absorb the entire plate closing force which often results in a much higher surface load on the membranes than the pressure within the chambers. This generally disadvantageously limits the maximum permissible operating pressure of plate filter presses to less than 20 bars.

Particularly in chamber filter presses, frequently the suspension is introduced and the filtrate is extracted through the membrane. Especially at higher pressures, this creates sealing problems and stress peaks in the membrane.

In conventional chamber filter presses, the filter chamber is surrounded by membranes on all sides. In this case, the membrane must serve as a support for a filter cloth. A nubby surface configuration on the membrane provides an opportunity for the fluid, e.g. olein, to flow off parallel to the filter surface. These membranes have the drawback that they can only withstand pressures up to a maximum of about 16 bars. At higher pressures, the nubs are compressed to such an extent that the fluid discharge channels become clogged. Moreover, the membranes have a thermal insulating effect and thus are not suitable as heat transfer members. Additionally, such surface configurations on the membrane create stress peaks which result in increased susceptibility to wear. Additional stress peaks in the membrane during operation occur as a result of typical nonuniformity of the plates' round configuration.

Another drawback of conventional chamber filter presses is that the press cakes left after fluid has been removed have irregular convex or concave shapes on both sides. Compared to a completely planar surface configuration, this invariably results in worsened release or slide-off of the filter cake once the chambers have been moved apart.

In conventional chamber filter presses, woven metal fabrics can not be employed because of their lack of flexibility. Only textile filter cloths are usable. However, compared to woven metal fabrics of the same pore size, filter cloths have the following drawbacks: (1) greater fluctuations in pore size and thus poorer crystal size separation selectivity; (2) greater flow resistance and thus longer pressing times; (3) more difficult cleaning; and (4) poorer cake release behavior.

In contrast to chamber filter presses, frame filter presses have the considerable drawback that, when the filter and membrane plates have been moved apart, the press cake gets stuck in the fixed chamber frame and does not drop out on its own.

Filter presses which can handle high pressures of more than 100 bars are also known, for example, cocoa butter presses using multi-chamber pots. Presses using multi-chamber pots have the following drawbacks: (1) they require a comparatively large amount of material; (2) they require a complicated apparatus for releasing the cake after pressing; and (3) because of the large number of nested, mutually displaceable, yet sealing, metal components, they require very high manufacturing tolerances. Thus, presses using multi-chamber pots are very heavy and expensive.

Filter presses such as the press disclosed in British Patent No. 907,485, also are used at very high pressure ranges. This press has one chamber defined in part by a filter and in part by an opposed elastically, extensible, liquid impervious membrane. First the membrane is expanded by a suspension to be filtered, then fluid on the opposing side of the membrane forces the liquid from the suspension through the filter. This press has the drawback that, at the end of the pressing process, the press cake has a closed, cylindrical shape which adheres to the filter medium and cannot be removed from the press without been broken. Removal of the cake can cause considerable difficulties when cake fragments cling to the filter medium or fragments drop down and wedge in annular gap of the cylindrical chamber. Moreover, cleaning of the membrane and filter medium requires the disassembly of the apparatus since they are otherwise inaccessible.

SUMMARY OF THE INVENTION

It is therefore an object of the present invention to provide a filter press which is suitable for pressures of at least about 25 bars to 120 bars and can simultaneously perform the functions of mechanical phase separation, temperature adjustment of the suspension, both heating and cooling, as well as using temperature adjustment to clean the suspension chamber and the filter medium, while avoiding the above-described drawbacks of the prior art filter presses.

The present invention solves these problems by a plate filter press for the mechanical separation of solids from a liquid suspension. The plate filter press is made of a plurality of vertical membrane plates and filter plates, the membrane plates and filter plates being alternately arranged one after the other. When the plate filter press is assembled, the space between the membrane plates and filter plates defines a filter chamber, which can be opened by moving the plates apart. A liquid impermeable and flexible membrane is positioned in the filter chamber and is sealed to the periphery of the membrane plate. The space between the membrane and the membrane plate defines a pressure medium chamber for receiving pressure medium. The space between the membrane and the filter plate defines a suspension chamber for receiving the suspension. Finally, a woven metal fabric filter is positioned on each side of the filter plate. Both the filter plates and the woven metal fabric filters are planar. Liquid from the suspension is discharged through the woven metal fabric filter toward the interior of the filter plates.

BRIEF DESCRIPTION OF THE DRAWINGS

The drawings illustrate an embodiment of the plate filter press according to the invention.

FIG. 4 is an enlarged sectional view of the location where a membrane is clamped in.

DETAILED DESCRIPTION OF THE PREFERRED EMBODIMENTS

Figure 2:
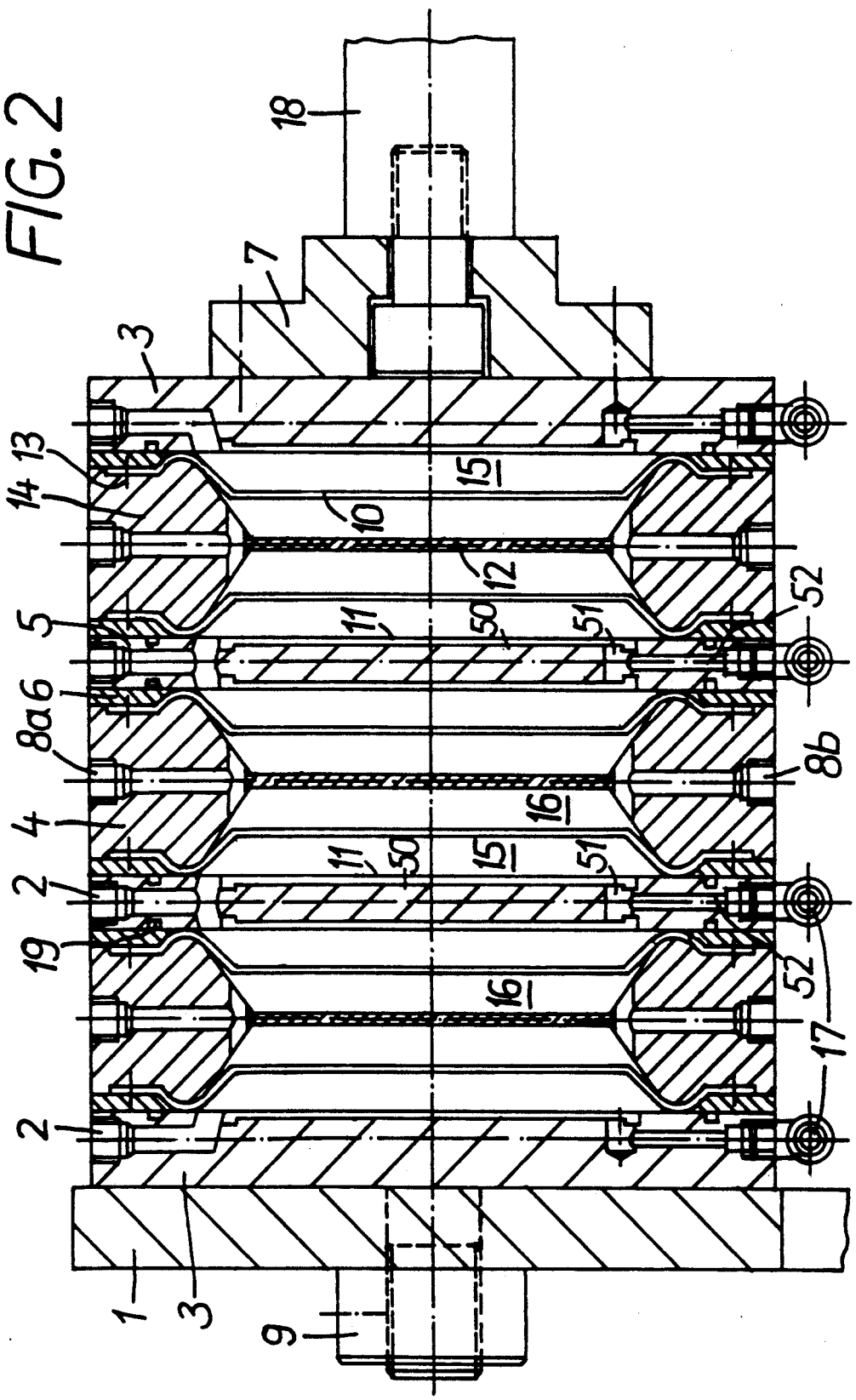
FIG. 2 is a longitudinal sectional view of the filter packet.
Figure 3:
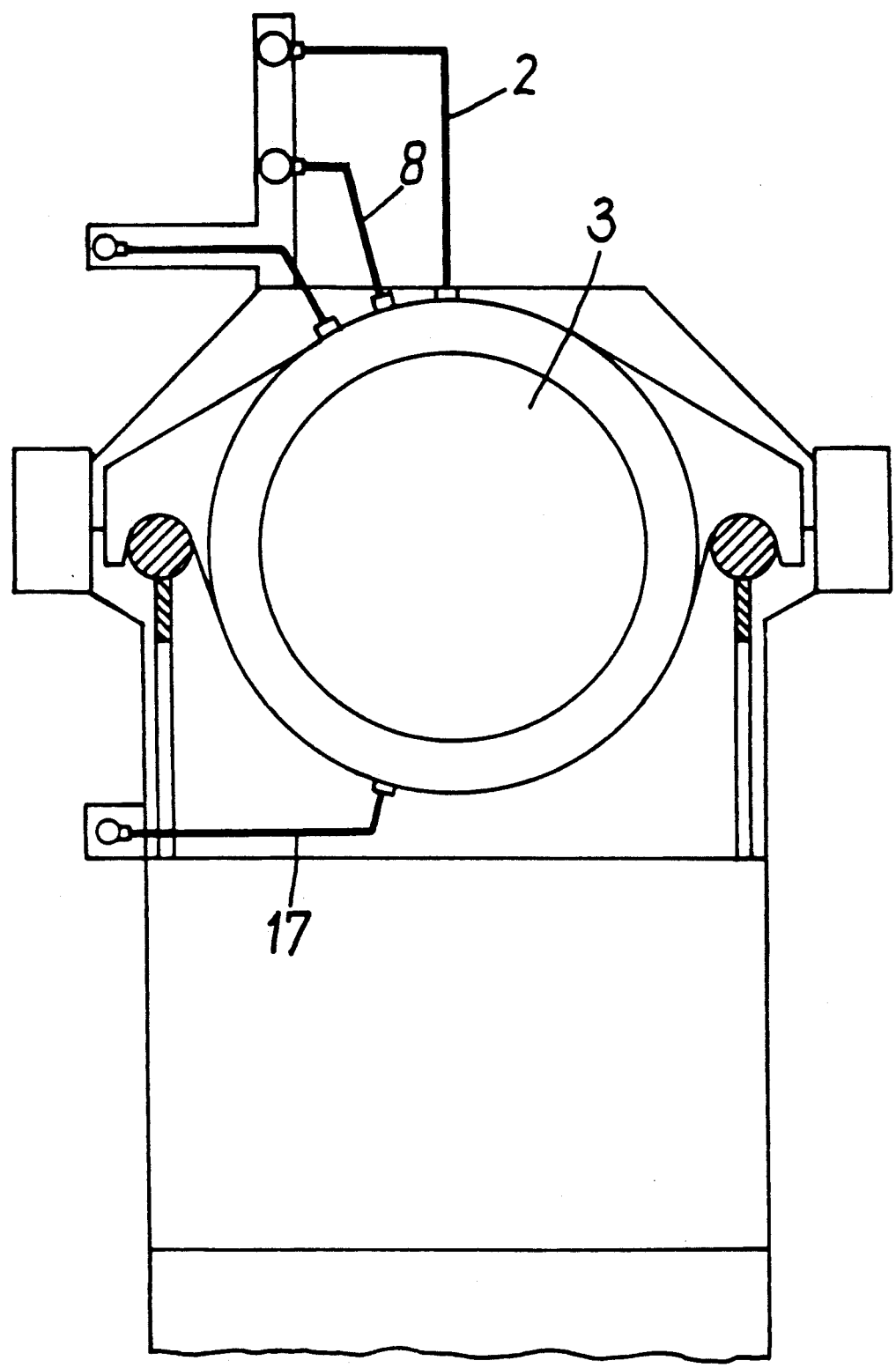
FIG. 3 is a front view of the filter packet.

As seen in FIG. 2, a plate filter press according to the invention is made of several filter plates 5 and membrane plates 14 which are alternatingly disposed one after the other. Each membrane plate 14 is shaped to have a central recess on both its sides in a center region and a recess 26 at its edges 4. The volume formed by each central recess in membrane plate 14 and adjacent filter plate 5 defines one filter chamber 15, 16. Both sides of membrane plates 4 and filter plates 5 are used to make up filter chambers for the filtration process resulting in good material utilization. A membrane 10 covers each side of each membrane plate from edge to edge. The membrane edges are disposed in the recesses in the edges of the membrane plate. The membrane is sealed in a fluid impermeable fashion to the membrane plate. Each filter chamber has two regions: one region between membrane 10 and the adjacent filter plate 5, when the press is assembled, forms a suspension chamber 15; and another region between membrane 10 and membrane plate 14 forms a pressure medium chamber 16. A filter 11, composed of a woven metal fabric, is disposed on both faces of the filter plate 5.

Figure 1:
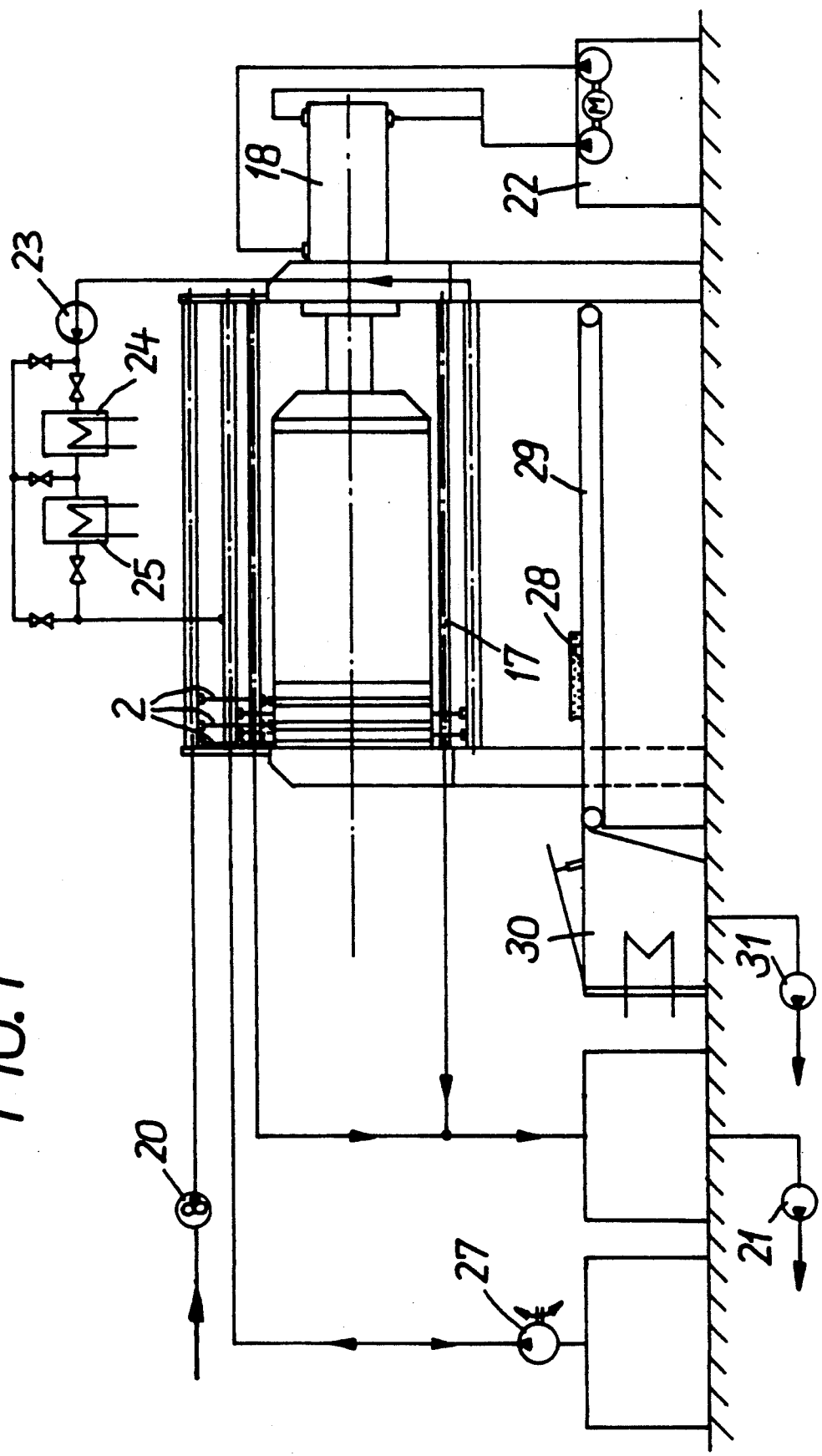
FIG. 1 is a diagrammatic view of a press.

Referring additionally to FIG. 1, a suspension to be treated is introduced in the filter press by means of a suspension pump 20 through suspension inlets 2 into suspension chambers 15 of membrane plates 14 and is then compressed by increasing the pressure in pressure medium chambers 16 which are filled with a hydraulic fluid having, for example, an aqueous base. The filtrate, for example olein, flows through filter 11 into discharge channels 50 with minimum flow resistance lying directly behind the filter M from where it is conducted downwardly through discharge channels 54 and 52 and discharged through a filtrate discharge 17 by means of a filtrate pump 21.

An end filter plate 3 is positioned on each end of the plate filter press. Closing forces are transmitted by a head plate 1 on one end and face front plate 7 on the other end onto end filter plates 3 by means of a hydraulic ram 18 which is operated, for example, by a hydraulic supply 22 and an abutment 9.

Figure 4:
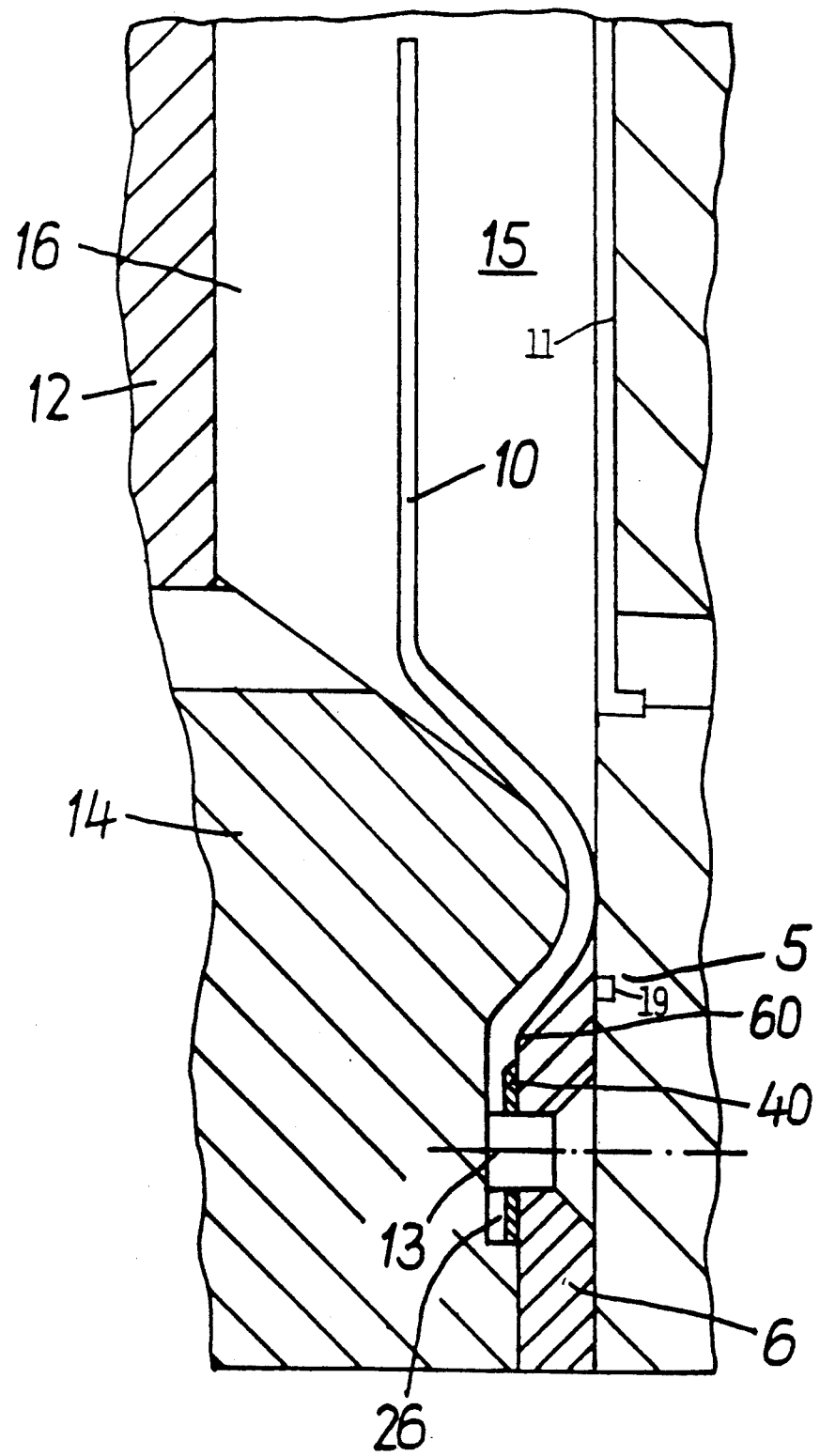

In a preferred embodiment, to avoid stress peaks on the membrane 10 which separates suspension chambers 15 from pressure medium chambers 16, the chambers, i.e. the membrane plates, membrane, and filter plates, respectively, have a uniformly round shape. The plate closing forces are not introduced into membrane 10 but are transmitted directly from membrane plates and filter plates by their form-locking mutual contact through the interposition of clamping rings 6 which are shown in FIG. 4 in greater detail. The chambers are also sealed toward the exterior by separate seals 19 and by the fact that membrane 10 is clamped in by clamping ring 6 which is fastened to membrane plate 14 by means of screws 13. Screws 13 are depicted in FIG. 2 by horizontal lines. This clamping which is adapted precisely to the compressive pressure of the pressure medium, simultaneously produces a mutual seal between the two chamber regions 15 and 16 separated by membrane 10. The deformation of the membrane in the region of edge 4 into the shape shown in FIG. 4 causes the maximum possible tensile stresses within membrane 10 to be reduced compared to, for example, a membrane clamped in a plane parallel to the surface of filter 11. Moreover, in the filter chamber region, the membranes are not interrupted by any passages, for example, for the introduction of the suspension or the discharge of filtrate.

The outer edges of membranes 10 are placed into correspondingly-shaped recesses 26 in the membrane plates and are sealed there by clamping ring 6. Membrane 10 is guided on an inner surface 60 of clamping ring 6 to the height of the clamping ring facing the adjacent filter plate. Thus, stress peaks in the membranes are substantially avoided. In particular, the interposition of clamping rings 6 between the filter plates 5 and the membrane plates 14 and the simultaneous overlap of the inner surface of the clamping rings beyond the membrane edge in recesses 26, provides for a clear separation of the force paths of the plate closing forces and the clamping ring forces. The plate closing forces are directed exclusively through the filter plates and membrane plates. The force path of the clamping ring forces to hold the membrane are directed along the membrane edge through the inner portion of the clamping ring and the recess. Thus, each of these forces can be optimally adjusted independently of one another. The guidance of the membranes from the clamping location inwardly along the length of the membrane plates prevents occurrence of stress peaks in this critical region, even during the last phase of each pressing process, when the membranes are distended and form-lockingly pressed against the filter plates when the suspension chamber is empty. Thus the properties of the membrane material can be utilized to a greater extent.

The dimensions of recesses 26 in membrane plates 14 preferably are chosen so that, when clamping rings 6 are seated firmly on the membrane plates, the portion of the clamping ring covering the recess clamps the membrane there with the optimum force for the filter operation. Additionally the recess dimensions can be adjusted with, e.g., packing disks 40. With this configuration it is possible, without modifying their structure, to set the membrane plates to practically any membrane thickness and any clamping force.

A smooth and elastic membrane is preferred which is preshaped for its edge to correspond to its clamped shape in the recess. The membrane is also shaped to follow the membrane plate at the plate's edge and, at its middle, to be positioned in the interior of the filter chamber at about half the filter chamber's width when the plates are assembled. This results in further equalization of the stresses on the membranes during the entire filtering process, further allowing higher pressure to be handled.

As stated above, filter chambers 15, 16 are formed from a central control recess on each side of the membrane plate. The two recesses, one on each side of one membrane plate, are separated from one another by a center partition 12. The recesses are shaped to narrow toward the center partition from their circumference, i.e. the membrane plate edges 4 are conical. This shape advantageously uses the volume of the membrane plates, and simultaneously enhances uniform stress distribution on the membrane. Additionally this design permits the easy introduction of pressure medium into the two pressure medium chambers 16 on either side of partition 12 through inlet 8a from the top of the membrane plate and the discharge of the pressure medium through outlet 8b at the bottom, also through the center of the membrane plate, that is, in the plane of center partition 12.

For a particularly favorable pressing process using temperature control, the temperature of the suspension is adjusted. The liquid pressure medium coming from a supply pump 27 is raised to the most suitable pressure level for the filtration requirements and simultaneously is heated to serve as a heat carrier. For this purpose, the pressure medium may be circulated during operation between the filter press and heat exchangers 24, 25 by a circulation pump 23 exclusively for the purpose of cooling and/or heating. The pressure medium flows through pressure medium chamber 16 through inlets and outlets 8a, 8b, respectively, and heat is transferred between the suspension and the pressure medium primarily through membrane 10. Due both to the membrane's smooth surface and its direct contact with the suspension and the pressure medium, respectively, on both its sides, the membrane offers minimum heat transfer resistance. This is a simple way to cause a very effective temperature adjustment of the respective regions of the plate filter press during the individual partial filtering steps.

Supply pump 27 keeps the pressure of the pressure medium at the most favorable level for the particular case, at a given temperature. For example, after a new charge of suspension has been introduced, the pressure increases up to the full filter pressure, which may be at least about 25 bars and may go up to 120 bars. After the pressing process, the pump reduces the pressure to ambient pressure allowing, once the press has been opened, the filter chamber to empty itself of the filter cake. During the emptying step, the pressure may be increased slightly so that the membrane pushes the filter cake off the filter. The pressure is again slightly raised after the press has been emptied and closed, causing the form-locking contact of the membrane 10 at the filter 11. The introduction of heated pressure medium in the pressure medium chamber, heating the membrane, causes any filter cake remains still adhering on the filter, for example crystalline fat particles, to melt. Thus, the filter can be cleaned, whereupon the pressure is reduced again to ambient pressure to introduce the next charge of suspension.

The optimum cake release and detachment behavior is realized by configuring the filter chamber with recesses which are exclusively disposed in membrane plate 14, while the surface of filter plate 5 is completely planar. Moreover, a woven metal fabric is used as filter 11. Additionally, in its clamping region, where it is held by clamping rings 6 in the recesses in membrane plate 14, membrane 10 is in direct form-locking contact with filter plate 5 immediately before it enters the chamber region. Thus there will be no obstructions in the membrane chamber region which go beyond membrane 10.

With the suspension chamber 15 empty, thermal cleaning of the filter medium is performed by pressing membrane 10 directly and in a form-lockingly fashion against filter plate 5. Filter plate 5 is then heated by means of the heated pressure medium to melt, for example, any crystalline filter cake residue or the like. As a prerequisite for the form-locking contact of the membrane with the surface of the filter plate, membrane 10 is initially brought in contact with the filter plate 5 in the clamping region along the edge of the chamber. Otherwise, the form-locking contact could not reliably be achieved and further the danger of the membrane being destroyed due to excess expansion in the vicinity of the clamping region would be heightened. Moreover, for such cleaning, a woven metal fabric for the filter medium is superior to a filter cloth since experience has shown that filter cloths have a far greater tendency to adhere to the membrane such a case, the destruction of the filter cloth could result.

The filter cakes 28 obtained from the press drop onto a conveyor belt 29 and are transported to a press cake container 30. The cakes are there further desiccated thermally and comminuted and are finally stored or prepared for shipment by way of a conveying device 31.

It will be understood that the above description of the present invention is susceptible to various modifications, changes and adaptations, and the same are intended to be comprehended within the meaning and range of equivalents of the appended claims.

What is claimed is:

1. A plate filter press for the mechanical separation of solids from a liquid suspension, comprising:
   a plurality of vertical membrane plates and filter plates, alternatingly arranged one behind the other to define a plurality of filter chambers each disposed between an adjacent membrane plate and filter plate and which can be opened by moving said plates apart, said filter plates and said membrane plates each being circular, each said membrane plate having an edge region with a recess; and
   an impermeable and flexible circular membrane disposed in each filter chamber and sealed to a peripheral area of the adjacent membrane plate defining a pressure medium chamber between said membrane and said adjacent membrane plate for receiving a pressure medium and a suspension chamber between said membrane and said adjacent filter plate for receiving the suspension, each said membrane having an outer edge portion which is disposed in and has a shape complementary to the recess in the respective membrane plates;

each of said filter plates including opposite sides and a woven metal fabric filter covering each of said opposite sides to form a planar surface with an interior region being defined between the respective fabric filters covering the opposite sides of each said filter plate for allowing liquid filtered from the suspension to discharge toward said interior region; and clamping rings each disposed between respective filter plates and membrane plates in said edge region, each clamping ring having an outer face facing an adjacent filter plate and an inner face facing the edge region of an adjacent membrane plate for clamping, in a sealing manner, a respective membrane at its outer edge portion to the membrane plate within said recess, said inner face being tapered radially inwardly toward said outer face, the membrane being held by the inner face of said clamping ring up to the height of the outer face of said clamping ring.

2. A plate filter press according to claim 1, including means for fixing said clamping ring to a respective one of said membrane plates, and wherein each of said recesses has a depth which is dimensioned so that a respective one of said clamping rings is fixed in firm contact on the respective membrane plate with a portion of said clamping ring covering said recess for clamping the membrane at that location with a clamping force at least as great as a force presented by of the pressure medium during operation of said press.

3. A plate filter press according to claim 2, further comprising at least one packing disc located for adjusted the depth of at least one recess.

4. A plate filter press as defined in claim 1, wherein each of said membranes has a smooth and elastic central region and is preshaped at its outer edge to be shaped complementarily to the recess of said membrane plate, with each said membrane having a central portion which is positioned at about the midpoint of said filter chamber between an adjacent membrane plate and filter plate when the filter press is assembled.

5. A plate filter press as defined in claim 1, wherein each membrane plate has a center partition and a circumferential edge region connected by said center partition, the circumferential edge region being constricted toward the center partition to form a central recess on each face of said membrane plate, each filter chamber being formed by the central recess and a respectively adjacent filter plate.

6. Plate filter presses according to claim 1, further comprising:

a pressure medium circuit for carrying a pressure medium through said pressure medium chambers;

circulating pump means connected to the pressure medium circuit for circulating a pressure medium through said pressure medium chambers;

heat exchanger means connected to the pressure medium circuit for controlling the temperature of the circulating pressure medium, the suspension being temperature controlled by heat exchange through said membranes; and supply pump means connected to the pressure medium circuit for adjusting the pressure of the circulating pressure medium.

7. Method of using a plate filter press as defined in claim 6, comprising:

emptying the suspension chambers; and subsequently controlling the supply pump for pressurizing the pressure medium chambers with heated pressure medium for pressing the membranes form-lockingly against the filters under a slight pressure whereby the filters are both heated and cleaned.

* * * * *